United States Patent
Bueter

(10) Patent No.: US 12,066,110 B2
(45) Date of Patent: Aug. 20, 2024

(54) PISTON RING

(71) Applicant: BÜMACH ENGINEERING INTERNATIONAL B. V., TA Emmen (NL)

(72) Inventor: Josef Bueter, Haren/Altenberge (DE)

(73) Assignee: Bümach Engineering International B.V., TA Emmen (NL)

( * ) Notice: Subject to any disclaimer, the term of this patent is extended or adjusted under 35 U.S.C. 154(b) by 0 days.

(21) Appl. No.: 18/043,238

(22) PCT Filed: Sep. 11, 2020

(86) PCT No.: PCT/DE2020/000205
§ 371 (c)(1),
(2) Date: Feb. 27, 2023

(87) PCT Pub. No.: WO2022/053087
PCT Pub. Date: Mar. 17, 2022

(65) Prior Publication Data
US 2023/0304579 A1    Sep. 28, 2023

(51) Int. Cl.
*F16J 9/08* (2006.01)
*F16J 9/20* (2006.01)

(52) U.S. Cl.
CPC .. *F16J 9/08* (2013.01); *F16J 9/20* (2013.01)

(58) Field of Classification Search
CPC . F16J 9/08; F16J 9/20; F16J 9/14; F02F 5/00
See application file for complete search history.

(56) References Cited

U.S. PATENT DOCUMENTS 1,756,905 A * 4/1930 Morton ............... F16J 9/14
                                                    277/924
1,841,772 A * 1/1932 Williams ............ F16J 9/063
                                                    277/467
(Continued)

FOREIGN PATENT DOCUMENTS

CN      105221291 A  *  1/2016  ........... F16J 15/3272
DE       3045871 A1    11/1981
(Continued)

OTHER PUBLICATIONS

Machine translation, Detailed Description of ES2079991A1, Errota, obtained from https://worldwide.espacenet.com/, pp. 1-4.*
(Continued)

*Primary Examiner* — Grant Moubry
(74) *Attorney, Agent, or Firm* — Laurence A. Greenberg; Werner H. Stemer; Ralph E. Locher

(57) ABSTRACT

A piston ring includes a ring body with a first body end and a second body end arranged opposite one another to define a ring joint. The body has a radial ring surface axially displaceable relative to an inner barrel surface and an inclined ring surface that rests on an inclined ring groove surface. The first body end has a projection section with a projection section separating surface. The second body end has a base section with a receiving contour, a base section separating surface and a base section contour. The projection section separating surfaces and the base section separating surface are in sealing physical contact and define a plane. The plane intersects the inclined ring surface and defines an inner separating line at a second intersection line of the plane with the inclined ring surface.

7 Claims, 11 Drawing Sheets

(56) References Cited

U.S. PATENT DOCUMENTS

| | | | | |
|---|---|---|---|---|
| 2,522,764 | A | * 9/1950 | Roberts | F16J 9/20 277/460 |
| 4,123,072 | A | 10/1978 | Sharpe | |
| 4,138,125 | A | 2/1979 | Lucas | |
| 4,256,318 | A | 3/1981 | Bush | |
| 4,848,212 | A | 7/1989 | Kawano et al. | |
| 2013/0119614 | A1 | * 5/2013 | Antunes De Oliveira | F16J 9/20 277/434 |

FOREIGN PATENT DOCUMENTS

| | | |
|---|---|---|
| DE | 3305920 A1 | 9/1983 |
| ES | 2079991 A1 | 1/1996 |
| FR | 635824 A | 3/1928 |
| GB | 2117086 A | 10/1983 |
| JP | S5884345 U | 6/1983 |
| JP | H0540650 U | 6/1993 |

OTHER PUBLICATIONS

Machine translation, Detailed Description of DE102009018297A1, Honned, obtained from https://worldwide.espacenet.com/, pp. 1-11.*

* cited by examiner

PISTON RING

FIELD AND BACKGROUND OF THE INVENTION

The invention relates to a sealing piston ring with a particularly high sealing effect.

The state of the art describes a multitude of different piston rings. Piston rings are used in mechanical and automotive engineering, in particular for engines, hydraulic cylinders and many other areas of application. Basically, the function of piston rings is to seal the movement gap between the cylinder bore and the barrel surface of the piston against liquid and gaseous pressure media. For this purpose, particularly split piston rings are used in the state of the art. The splitting of the piston ring at the circumference is also known as the ring gap. Normally, piston rings have a resilient design to adapt to a cylinder bore. Piston rings are manufactured in a tension-free oval shape. They take on their intended rounded shape, which fits to the cylinder wall, when being installed, and then they exhibit a certain amount of pretension. Since the ring gap does not close completely in the installed condition to compensate for thermal elongations, there is always a certain amount of leakage. This results in pressure loss and medium overflow. As the sealing function of the piston ring depends on many factors, there is still a great need for optimization.

Firstly, the sealing surfaces are formed on the sliding surface, which is formed on the barrel surface of the cylinder bore and on a shoulder surface of the ring groove of the piston. Therefore, the surface pressure of the sealing function depends on the pressure of the medium and the pretension force of the sealing ring. The latter dependence is a constant magnitude so that only the pressure of the medium has a dynamic effect.

Further, it is basically known from the prior art to provide an overlap of the two opposing piston ring ends at the ring joint in order to reduce the open cross section and thus pressure loss and medium overflow. The disadvantages of this solution are that the sealing effect is too low for many applications and that the remaining leakage increases with increasing wear.

SUMMARY OF THE INVENTION

The task of the invention is to provide a sealing piston ring with a high sealing effect, which is suitable for a wide range of applications, in particular for hydraulic and pneumatic applications and for applications in combustion processes, such as internal combustion engines, and which has a high wear resistance.

The task is solved by the features indicated in the independent claim. Preferred further embodiments result from the dependent claims.

The piston ring according to the invention is a substantially rotationally symmetric component which is split around the circumference and thus has a ring body and a ring joint.

The ring body has a ring body surface and a first and a second ring body end.

In particular, the ring body surface has a radial ring surface and an inclined ring surface.

The radial ring surface is formed as a sliding contact surface axially displaceable relative to a cylindrical inner barrel surface of a cylinder. Thus, the radial ring surface is in physical contact with the inner wall of the cylinder in a manner known per se when the piston according to the invention is used as intended, wherein the physical contact is a sliding contact when the piston moves with respect to the cylinder.

In addition, the ring body surface has an inclined ring surface which is formed as a lay-on surface to an inclined ring groove surface of an outer ring groove of a piston.

The design of the inclined ring surface, which engages with a correspondingly designed inclined lateral ring surface of a circumferential ring groove in the piston when used as intended, facilitates the dynamic expansion of the piston ring. This expansion takes place via the obliquely acting force of the inclined ring surface. Thus, the axially acting force resulting from the pressure load of the pressure medium leads to an obliquely acting contact force on the inclined surface of the piston groove. In addition, the wedge effect on the inclined ring surface leads to a radial expansion of the piston ring and to a force effect on the surface pressure between the radial ring surface and the inner barrel surface of the cylinder. This in turn provides an increased sealing effect. At the same time, the surface pressure is reduced to the surface pressure based on the spring effect during a return movement of the piston without working pressure and, thus, wear is reduced.

Furthermore, the inclined ring surface supports the automatic readjustment of the piston ring in case of wear on the radial ring surface or at the inner cylinder wall of the cylinder.

According to the invention, the ring body ends are arranged opposite to each other at the ring joint. Thus, they form the ring joint.

According to the invention, the first ring body end and the second ring body end are designed to complement each other. Specifically, the first ring body end comprises a projection section and the second ring body end comprises a base section.

The first ring body end has the projection section with a projection contour cross section. The projection contour cross section is determined by the shape of the projection and denotes the contour of the projection section in a radial sectional plane parallel to the main longitudinal axis. Thus, the projection contour is formed by a physical section of the piston ring.

The second ring body end has a base section with a base section contour, wherein the base section simultaneously forms a receiving contour with a receiving contour cross section. The base section contour is formed by a physical section of the piston ring, whereas the receiving contour is a free space. The receiving contour cross section is defined by the free space not filled by the base section contour and is also a contour in the radial section plane parallel to the main longitudinal axis. The section plane is the same as the one of the projection section contour cross section.

According to the invention, the projection section engages in the receiving contour. Here, the receiving contour cross section and the projection contour cross section coincide. The projection contour cross section as a physical category fills the receiving contour cross section as a free space.

According to the invention, a projection section separating surface of the projection section and a base section separating surface of the base section are provided opposite to each other in areal and sealing physical contact and form a separating plane. The projection section separating surface and the base section separating surface are hereinafter collectively also referred to as the separating surfaces.

The separating surface has an inverse inclination with respect to the inclined ring surface. Inverse inclination is to be understood such that both the inclined ring surface and the separating surface each have an inclination with respect to a main areal plane of the piston ring, wherein these inclinations each exist relative to a different side of the main planar plane.

According to the invention, the separating plane is further characterized by the fact that it intersects the radial ring surface and forms an outer separating line at an intersection line of the separating plane with the radial ring surface.

In addition, the separating line also intersects the inclined ring surface and forms an inner separating line at an intersection line of the separating plane with the inclined ring surface.

Hereinafter, the outer separating line and the inner separating line are also collectively referred to as the separating lines.

The two separating lines also define the two separating surfaces. They are the radial boundaries of the two separating surfaces.

In particular, the piston ring according to the invention is characterized in that at least one of the two separating lines has a curvature radius which is concentric with respect to the ring body.

Thus, a solution has been surprisingly found which reliably provides almost complete sealing against fluid and gaseous pressure media, as the ring body ends always automatically align axially, radially and also tangentially relative to each other by the inclinations of the inclined ring surface and of the separating plane as well as by the concentric separating line design, so that sealing areal physical contact is established at the separating surfaces.

The ring body ends engaging one into the other and designed in this way have a very precise sealing geometry that exhibits a sealing overlap even with variable circumferential expansion and the resulting variable ring gap. This feature also results from the fact that at least one separating line, preferably both separating lines, have a concentric curvature radius. Thus, the piston ring can expand or contract in the circumferential direction at any time and the seal via the separating line is maintained. The expansion or contraction around the circumference can result from an undulating shape of the inner barrel surface of the cylinder or from temperature-induced expansion or shrinkage or from wear.

Advantageously, the piston ring according to the invention is capable to compensate for these factors while simultaneously maintaining its particularly high tightness.

In addition, the projection section can slide radially and in circumferential direction on the separating surface to the base section at any time. This ensures wear compensation at all times, resulting in a consistent sealing function.

Due to the inclined ring surface, the piston ring according to the invention advantageously exhibits a self-centering effect which supports a concentric alignment of the piston ring to a piston.

Furthermore, it is advantageous that the piston ring can be preferably made of metal and, thus, it can also withstand high temperature stresses.

Advantageously, the piston ring according to the invention can thus be used, in particular in combustion engines but also in hydraulic or pneumatic working cylinders or damping cylinders as well as in all other applications in which a high degree of tightness is required or is particularly advantageous.

According to a first advantageous further development, both the outer separating line and the inner separating line have a radius of curvature that is concentric with respect to the ring body. In addition, both separating lines thus have a curvature radius that is concentric with respect to each other and therefore the same.

This development has the particularly advantageous effect that both at the radial ring surface, which is in sealing sliding contact to the inner barrel surface of the cylinder, and at the inclined ring surface, which is in sealing contact with the lateral surface of the ring groove of the piston, all the sealing surfaces involved come together and thus provide a particularly high level of sealing.

Furthermore, it is advantageously made possible that a change in the circumference of the piston ring does not have any effect on the sealing, since the separating surface of the projection section and the separating surface of the base section can move tangentially one to the other, i.e., along the curvature radius, and thus maintain the areal sealing physical contact.

According to a next advantageous further development, the separating surfaces of the ring body ends are designed as lateral truncated-cone surfaces.

In this development, the separating surface of the projection section, which is designed as a truncated-cone surface, and the separating surface of the base section, which is designed as a truncated-cone surface, are opposite to each other, wherein the separating surface of the projection section is a concave inner truncated-cone surface and the separating surface of the base section is a convex outer truncated-cone surface. Both opposing truncated-cone surfaces have the same geometry and can therefore be moved both longitudinally and transversely relative to each other, thus ensuring a particularly high level of tightness.

Due to this shape of the separating surfaces, the sealing effect is maintained even in the event of changes in the circumference or in case of wear. Moreover, the inverse inclination to the inclined ring groove surface of the outer ring groove reinforces the sealing surface pressure thanks to the radial force effect.

According to a next advantageous further development, the receiving contour cross section is designed as a triangle.

Preferably, this shape forms an isosceles triangle. Here, the base side rests at the inner barrel surface of the cylinder and the first leg rests in the receiving contour at the base section. The second leg corresponds to the inclined ring surface and rests against the side wall of the ring groove of the piston. The same will apply, if the triangle is not an isosceles triangle.

The triangular contour of the receiving contour cross section makes a particularly wear-induced compensation of the positional relationships between the base section, the projection section and the inner barrel surface of the cylinder possible, while maintaining the areal sealing physical contact and thus the sealing effect. Thus, the above-mentioned components align themselves automatically relative to each other and, therefore, they bring about the wear-independent tightness.

In a next advantageous further development, the separating surfaces are designed as wire erosion surfaces. This precise manufacturing process leads to surfaces with a high overlap accuracy of the projection section separating surface and the base separating surface. Leakage through gaps between the separating surfaces, which can be caused by other manufacturing processes, is thus advantageously minimized or even completely eliminated. The result is a reliable sealing effect.

In a next advantageous further development, the ring body has a further inclined ring surface, wherein the inclination of the further inclined ring surface is inverse to the inclined ring surface. Thus, the piston ring preferably has a trapezoidal cross section.

This further development has special advantages, particularly in double-acting cylinders. Here, the pressure medium acts on the piston in an alternating axial direction. In order to achieve the same mode of action in both load cases, the two inclined ring surfaces of the piston ring are opposite to each other in the axial direction and are inclined in opposing directions.

In a next advantageous further development according to the variant just described, the first ring body end has a further projection section with a further projection contour cross section. Furthermore, the base section has a further receiving contour with a further receiving contour cross section. Moreover, the further projection section engages in the further receiving contour, and the further receiving contour cross section and the further projection contour cross section coincide. Consequently, a further projection section separating surface of the further projection section and a further base section separating surface of the base section are in face-to-face areal and sealing physical contact and form a further separating plane. In addition, the further separating plane has an inverse inclination with respect to the further inclined ring surface, wherein the further separating plane intersects the radial ring surface and forms a further outer separating line at an intersection line of the further separating plane with the radial ring surface. Furthermore, the further separating plane intersects the further inclined ring surface and forms a further inner separating line at an intersection line of the further separating plane with the further inclined ring surface, wherein these define the further separating surfaces. In addition, the further separating lines have curvature radiuses that are concentric with respect to each other and with respect to the ring body.

This further development of the piston ring according to the invention provides a solution with particular advantages for a double-acting cylinder. The piston ring geometry is mirrored on the axially perpendicular planar surface of the piston ring—also referred to as the main plane—and the piston ring has two opposing, alternatingly inclined ring surfaces now. In addition, the geometry of the ring body ends is reflected in the main plane. In this way, the wedge effect, which acts on the piston ring in the distal radial direction and stretches it around the circumference, is also given in the case of an alternating piston movement in both piston movement directions. The radial ring surface of the piston ring is pressed against the inner barrel surface of the cylinder during both the inward and outward movements of the piston.

According to a further advantageous further development, the piston ring is provided with at least one weakening recess. Preferably, there are several weakening recesses which are distributed around the circumference at a uniform angular distance from each other and from the ring joint. This design uniformly reduces the spring-force-induced contact forces on an inner barrel surface of a cylinder distributed around the circumference and supports the free movement and self-adjusting action between the projection section and the base section. And, at the same time, the advantageous contact forces caused by the operating pressure of a pressure medium remain unimpaired. It is particularly advantageous that a piston ring with the same initial geometry and the same material can thus be adapted by the spring-force-induced contact pressure to the individual application requirements in a simple manner.

A further aspect of the invention is a piston ring arrangement. This arrangement has a first and a second piston ring, wherein these two piston rings are piston rings according to the invention.

In this design, the piston rings each have an axial ring surface. In addition, the piston rings are arranged in parallel, wherein the axial ring surface of the first piston ring and the axial ring surface of the second piston ring rest in physical contact one at the other. Thus, the two piston rings are arranged either rotated or mirrored to each other in the same ring groove of the piston. The ring groove has a trapezoidal, radially expanding cross section and has two inclined, preferably symmetrically inclined, groove side surfaces.

This arrangement according to the invention represents a further solution with particular advantages for a double-acting cylinder. Two mutually mirrored piston rings are used one on top of the other. This makes it possible to provide an equally effective seal against a pressure medium that alternately acts from two axially opposite sides. This variant also has the advantage that compensation for different tolerances of the cylinder-piston arrangement is significantly improved by the installation position of the rings floating to each other. There are also the technological advantage and cost benefit that the first and the second piston ring are preferably identical and thus only one type of piston ring can be used in two exemplars. The trapezoidal cross section of the ring groove in conjunction with the inclined ring surfaces of the piston rings has also the effect that they are automatically centered relative to one another.

By using an exemplary embodiment, the invention is explained in more detail below on the basis of the attached drawings.

DETAILED DESCRIPTION OF THE INVENTION

Figure 1:
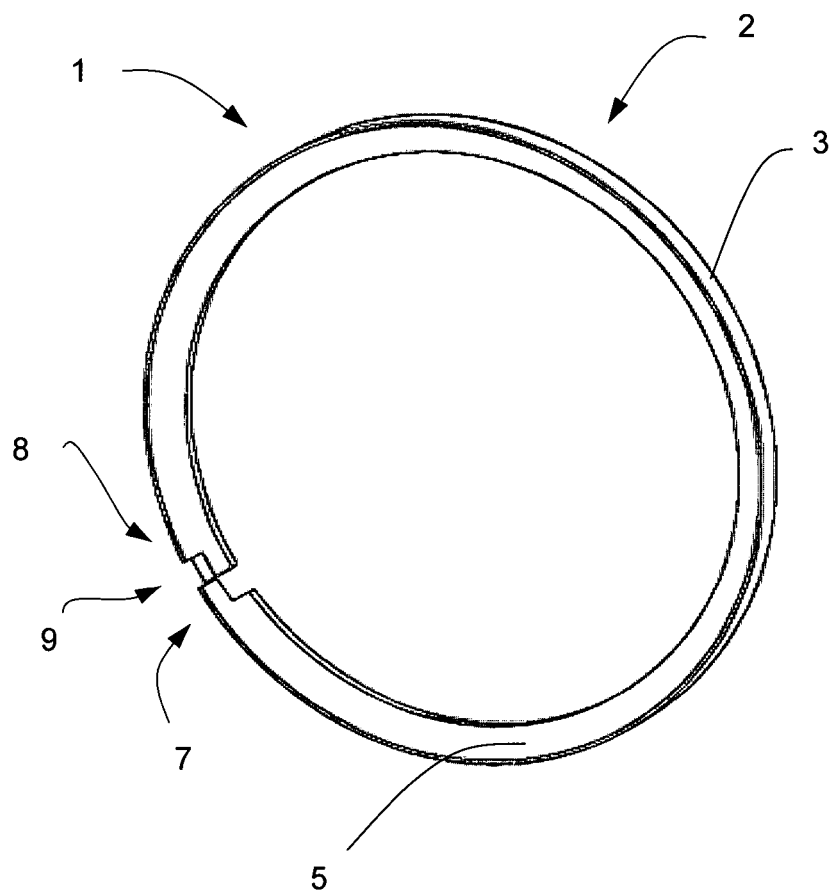
FIG. 1 Oblique view of a piston ring
Figure 2:
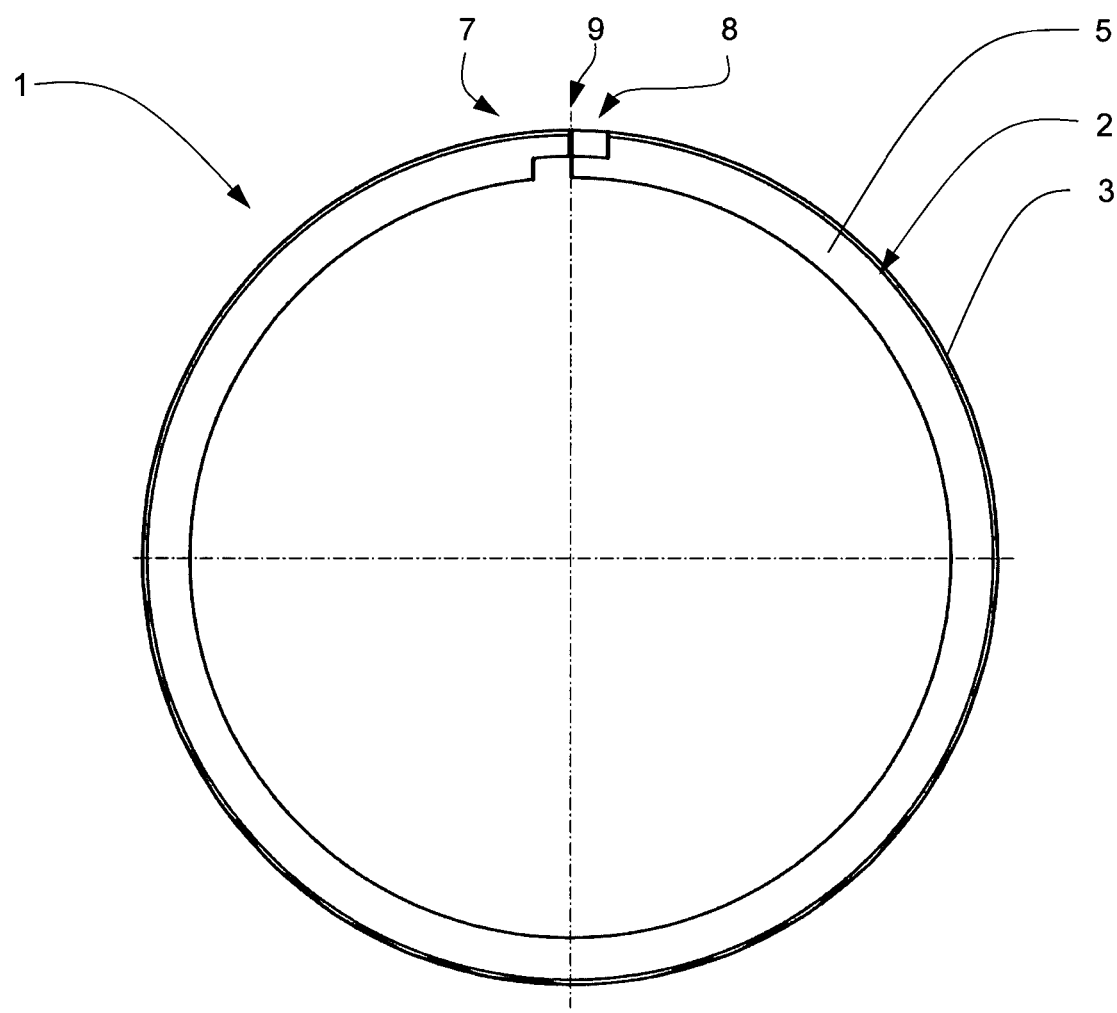
FIG. 2 Top view of a piston ring

FIG. 1 shows the piston ring for a first overview in an oblique view; FIG. 2 shows the piston ring in a top view along the main longitudinal axis, which corresponds to the movement axis of the piston. Both FIGS. 1 and 2 show the ring body 1 with the ring body surface 2, which comprises the radial ring surface 3 and the inclined ring surface 5. The ring body 1 is interrupted at one point. Here, a first ring body end 7 and a second ring body end 8 are situated opposite to each other. The interruption between them forms the ring joint 9.

The ring is shown in the unassembled, relaxed production position, also referred to as the relaxation position. In this embodiment, the ring body ends 7, 8 do not project one above the other in the relaxation position. In an alternative design—not shown here—a partial projection into the respective other ring body end 7, 8 already exists in the relaxation position.

Figure 3:
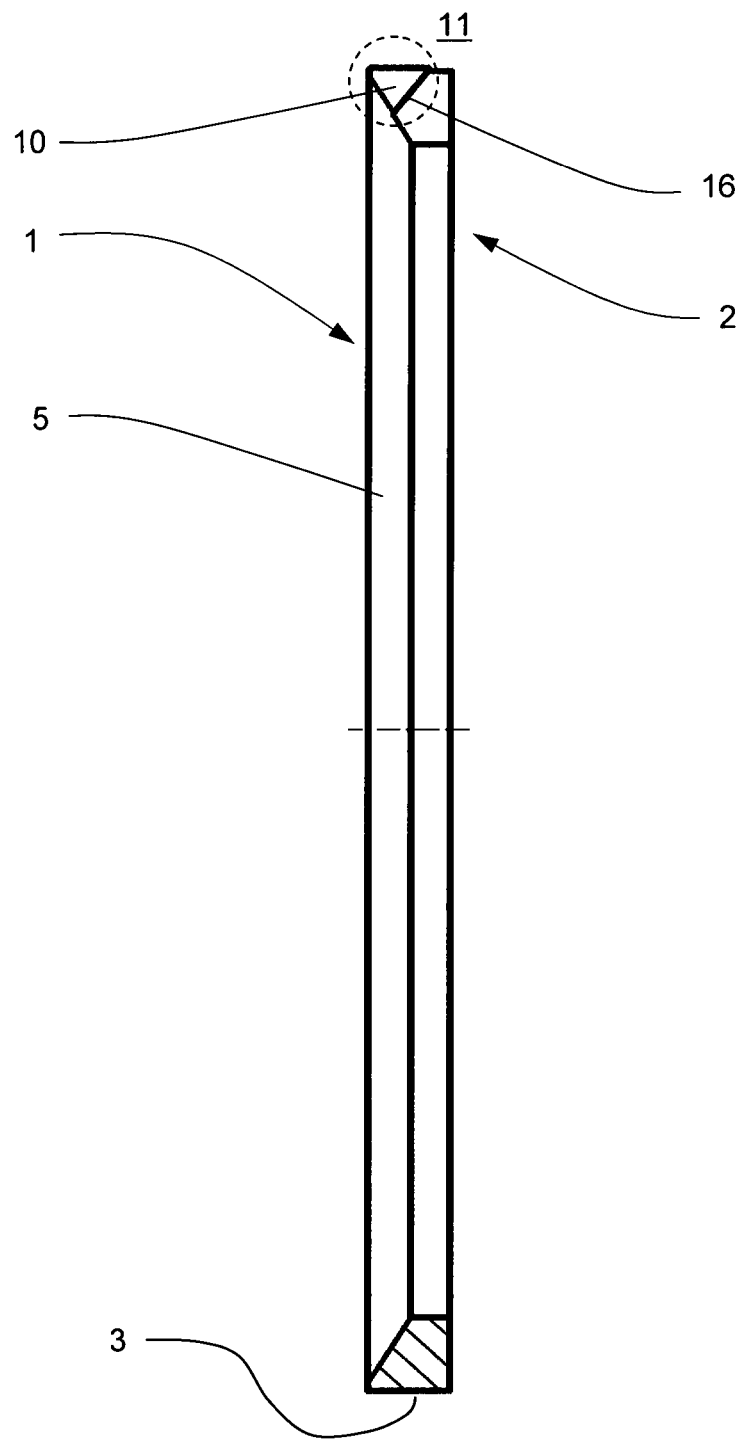
FIG. 3 Cross sectional view of a piston ring

FIG. 3 shows the cross section of the ring body 1 through the ring joint 9. The ring body surface 2 designates the surface of the complete piston ring. The outer barrel surface of the ring body 1 is the radial ring surface 3. On an axial side, the ring body 1 has the inclined ring surface 5 by means of which the piston ring engages in the matching counter contour of a circumferential ring groove of a piston. Furthermore, the projection section 10 with the projection contour cross section 11—highlighted by the dashed circular line—as well as the projection section separating surface 16 are shown.

Figure 4:
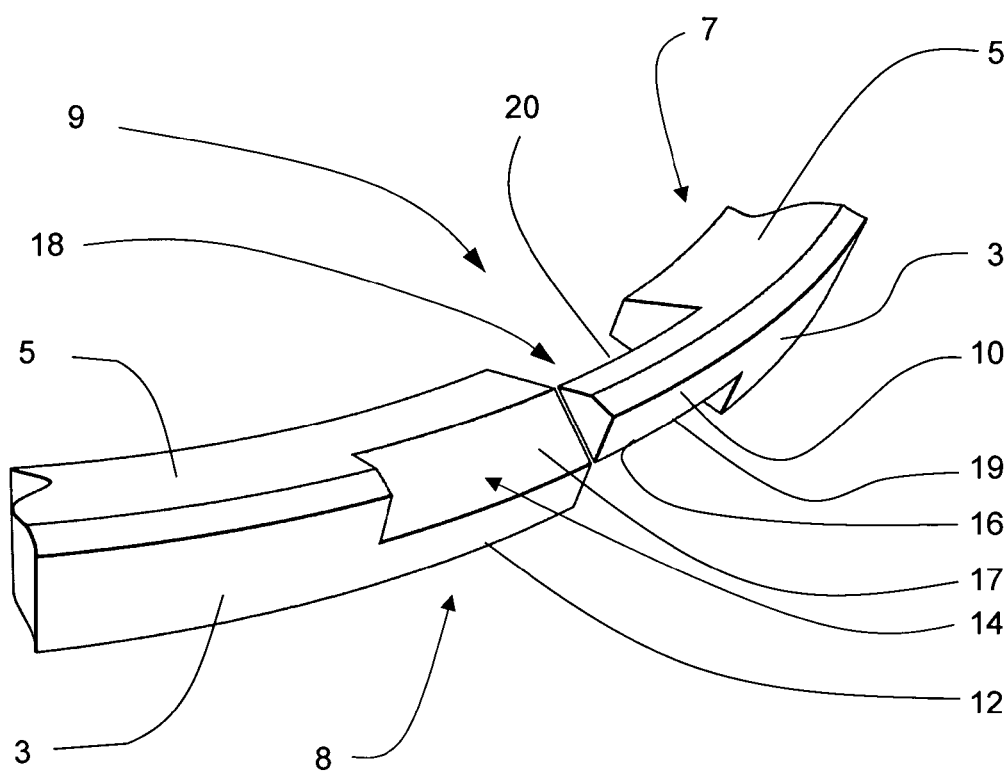
FIG. 4 Detailed section of a piston ring at the ring body ends in an oblique view FIG. 5 Sectional view and schematic representation of the ring body ends FIG. 6 Cross sectional view of a piston ring with two inclined ring surfaces FIG. 7 Cross sectional view of a piston ring with two inclined ring surfaces and two projection sections FIG. 8 Schematic view of a piston ring with two inclined ring surfaces and two projection sections FIG. 9 Schematic view of the base section of a piston ring with two inclined ring surfaces and two projection sections FIG. 10 Top view of a piston ring with weakening recesses FIG. 11 Cross sectional view of a piston ring arrangement.

FIG. 4 shows the section of the piston ring at the ring joint 9 and at the ring body ends 7, 8 in an oblique view.

The non-installed shape of the piston ring in the relaxation position is illustrated in this view. It shows to the outside of the piston ring in the direction of the radial ring surface 3. The inclined ring surface 5 is located circumferentially at an angle of inclination to this. The projection section 10 is located at the first ring body end 7 and comprises the projection section separating surface 16 opposite to the view direction in FIG. 3.

The corresponding counterpart at the second ring body end 8 forms the base section 12. The receiving contour 14 is defined by the separating plane 18; it forms the separating surface of the base section and receives the projection section 10 in an areal manner. In the tensioned installation position, the projection section 10 with the projection section separating surface 16 lies flat on the base section 12, i.e., on the base section separating surface 17. The separating plane 18 is formed there. The piston ring interrupted at the ring joint 9 is sealed again by the areal contact of the projection section separating surface 16 and the base section separating surface 17 in the separating plane 18.

In the overlap zone of the projection section separating surface 16 and the base section separating surface 17, the separating plane 18 has the shape of a section of a truncated-cone surface in this exemplary embodiment. The inner separating line 20 is formed at the curved edge to the inclined ring surface 5 and the outer separating line 19 is formed at the curved edge to the radial ring surface 3. The separating lines 19, 20 describe circular arcs which are arranged concentrically to the circle center point of the ring body, thus enabling a congruent sliding of the projection section separating surface 16 and the base section separating surface 17 on top of each other during a circumferential expansion or circumferential reduction of the piston ring.

Figure 5:
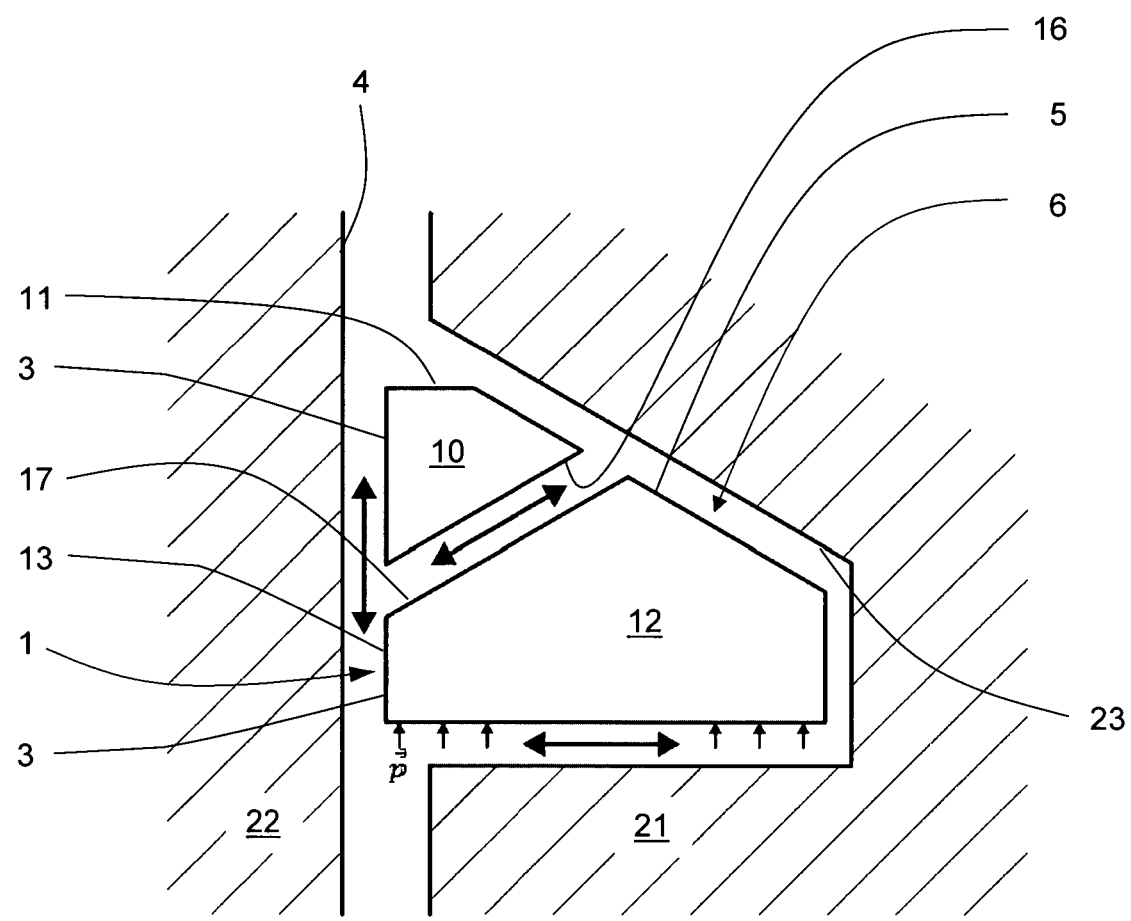

FIG. 5 is a schematic representation of the piston ring in the installed condition. The individual gaps between the various components are greatly enlarged for a better view and are not true to scale. FIG. 5 as a schematic diagram is intended to illustrate the positional and movement relationships of the components and the forces acting on them.

Thus, according to FIG. 5, the ring body 1 is installed in a ring groove 6 of a piston 21. This groove is designed with an inclined ring groove surface 23. When the piston moves in the cylinder, the piston ring slides with the radial ring surface 3 axially off the inner barrel surface 4 of the cylinder 22. The pressure medium acts with the pressure p on the planar, axial ring surface of the piston ring (no reference numeral). The piston ring is pressed in the ring groove 6 of the piston 21 against the inclined ring groove surface 23 and slides thereon with its inclined ring surface 5. The inclination is designed such that it provides a sealing effect against the pressure medium and, at the same time, also causes a radial force on the piston ring due to the wedge effect and thus expands it. This in turn ensures that the radial ring surface 3 is pressed against the inner barrel surface 4 of the cylinder 22, which leads to an increased sealing effect. In addition, the projection contour cross section 11 can slide off with the projection section separating surface 16 on the base section separating surface 17 of the base section contour 13 both transversely—as shown by the double arrow between the separating surfaces 16, 17— and longitudinally, i.e., along the circumference. At the same time, the projection section 10 and the base section 12 are axially displaceable relative to each other along the radial ring surface 3 and the inner barrel surface 4 so that the gap between the separating surfaces 16, 17 can always be closed again, even in case of wear.

This sliding-off of the separating surfaces 16, 17 transversely and longitudinally in conjunction with the axial displaceability of the sections 10, 12 enables compensation for material abrasion on the piston ring due to wear and always ensures areal contact and thus a constant sealing effect during the service life.

Figure 6:
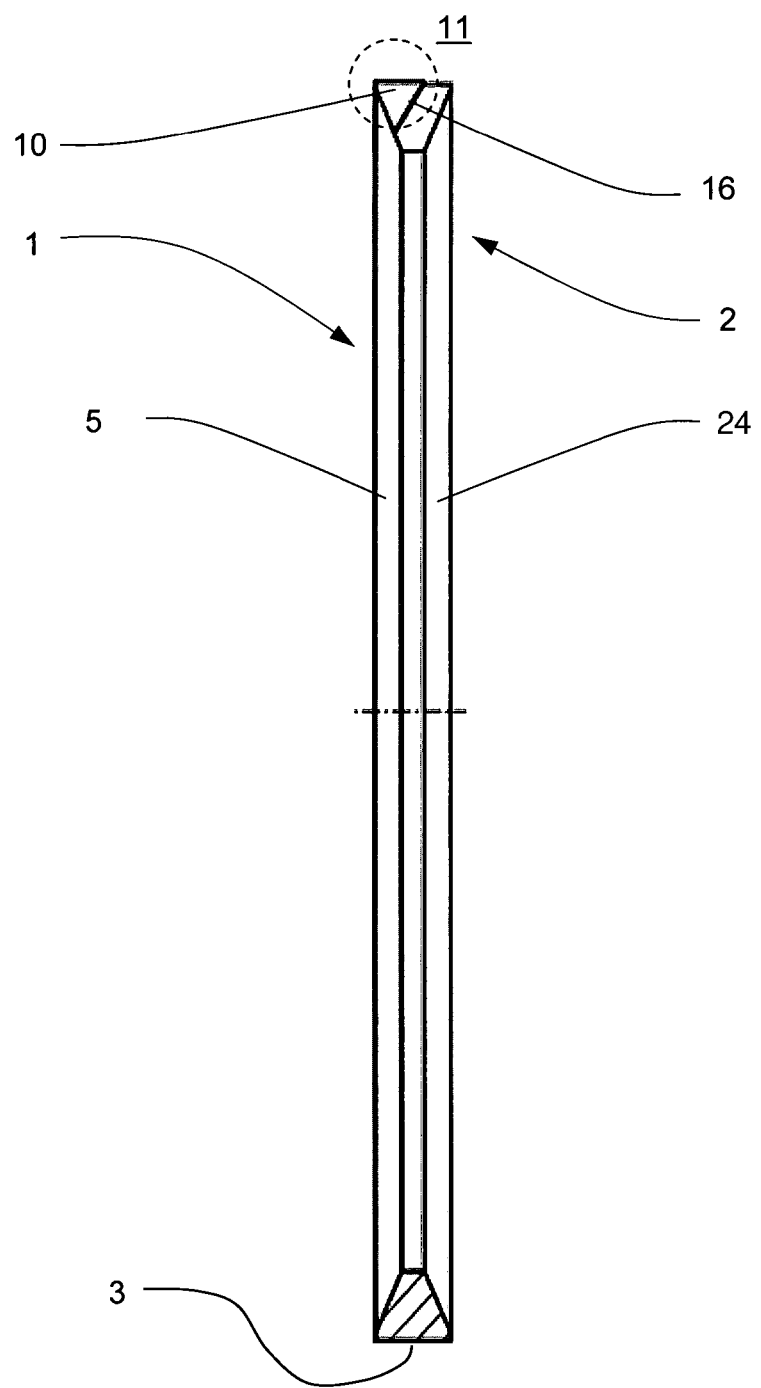

FIG. 6 shows an embodiment in which the piston ring has a further inclined ring surface 24.

Primarily, the explanations to FIG. 2 apply in a corresponding manner. In addition, the further inclined ring surface 24 is provided here. In this embodiment, the ring surfaces 5, 24 are positioned symmetrically opposite to each other.

Figure 7:
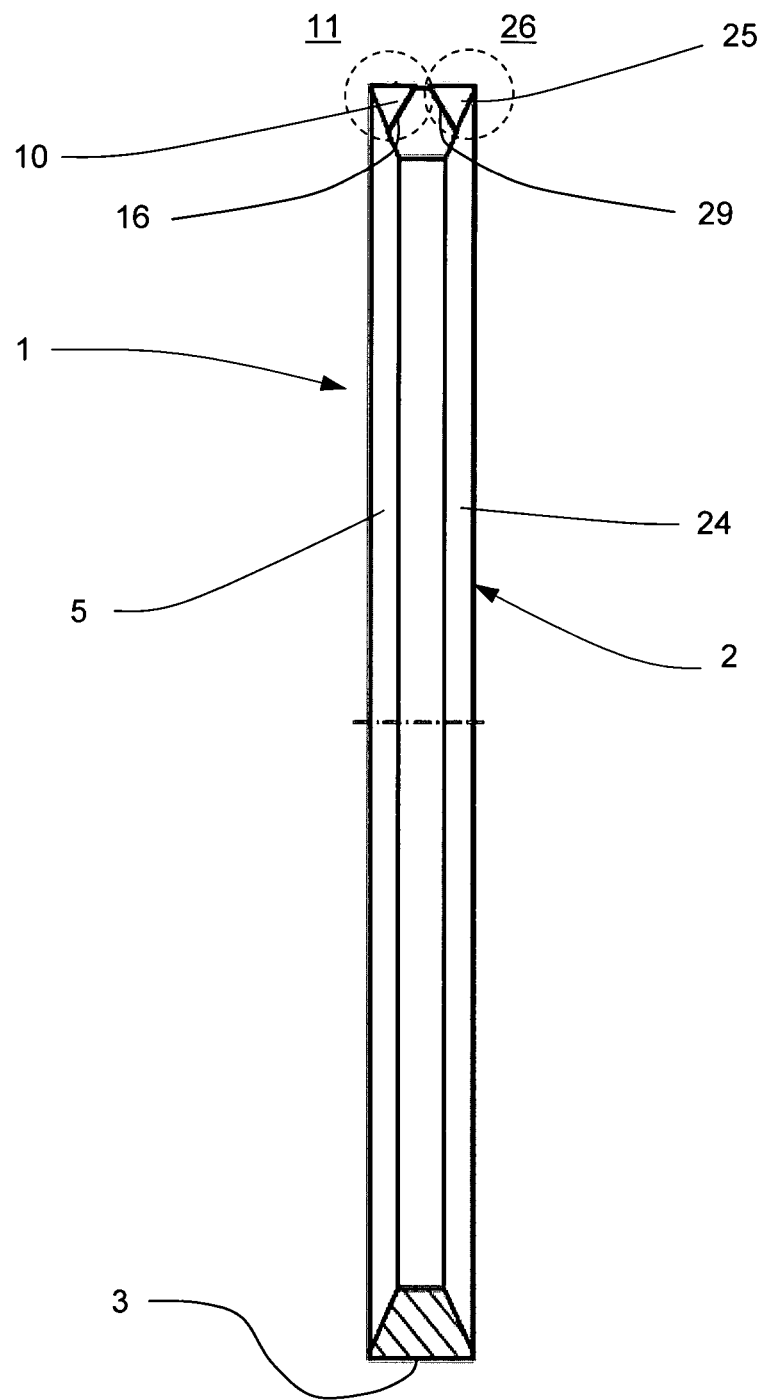
Figure 8:
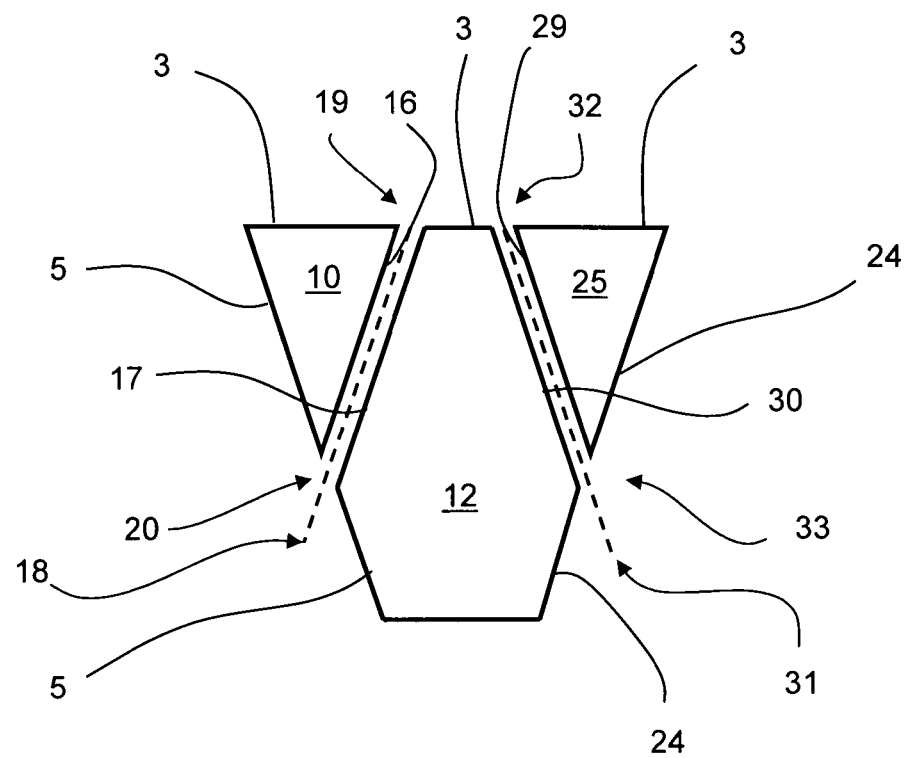

FIG. 7 and FIG. 8 show an embodiment in which the piston ring has, in addition to the further inclined ring surface 24, a further projection section 25 and a further projection contour 26. For better illustration, FIG. 7 shows schematically the symmetrical design in the exemplary embodiment, and also here, as in FIG. 4, the gaps between the various components are greatly enlarged for a better view and are not true to scale.

The inclined ring surface 5, the projection section separating surface 16 and, opposite thereto, the base section separating surface 17 of the base section 12 with the separating plane 18, formed in between and defined by the inner separating line 20 and the outer separating line 19, are allocated to the projection section 10.

The further inclined ring surface 24, the further projection section separating surface 29 and, opposite thereto, the further base section separating surface 30 of the base section 12 with the further separating surface 31, formed in between and defined by the further inner separating line 33 and the further outer separating line 32, are allocated to the further projection section 25.

Figure 9:
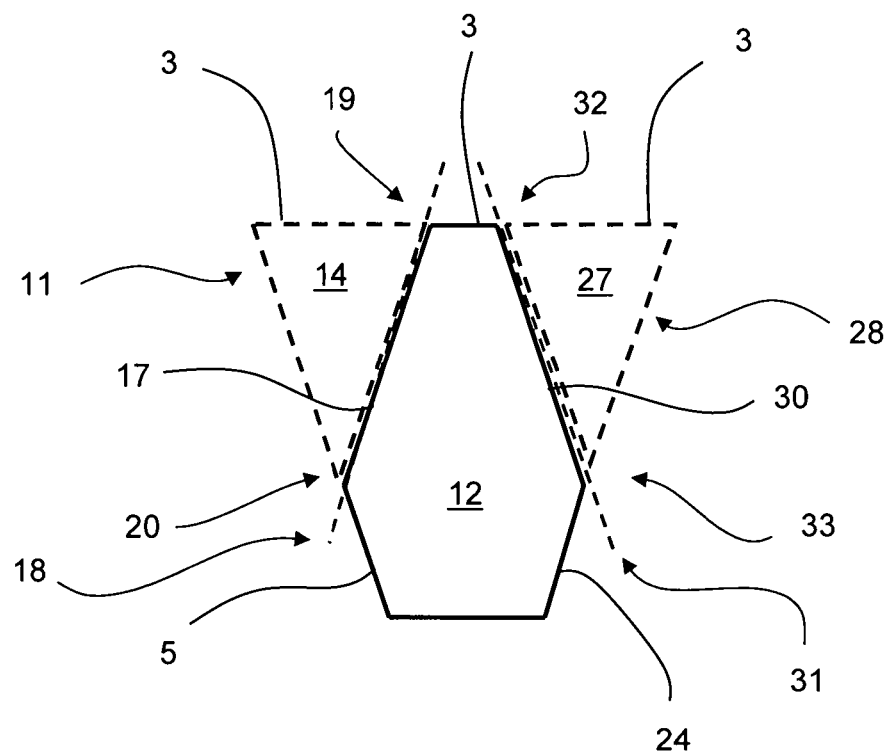

FIG. 9 shows the base section 12 in a schematic sectional view in a radial sectional plane. FIG. 9 shows, in particular, the receiving contour 14 with its receiving contour cross section 11 as well as the further receiving contour 27 with its receiving contour cross section 28. In all other respects, the contents of the description for and reference numerals of FIG. 7 apply accordingly. In the installation space spanned by the further receiving contour 27, the further projection section 25 is arranged in a tensioned condition, as shown in FIG. 7. Accordingly, the projection section 10 is arranged in a tensioned position in the installation space spanned by the receiving contour 14, as also shown in FIG. 7.

Figure 10:
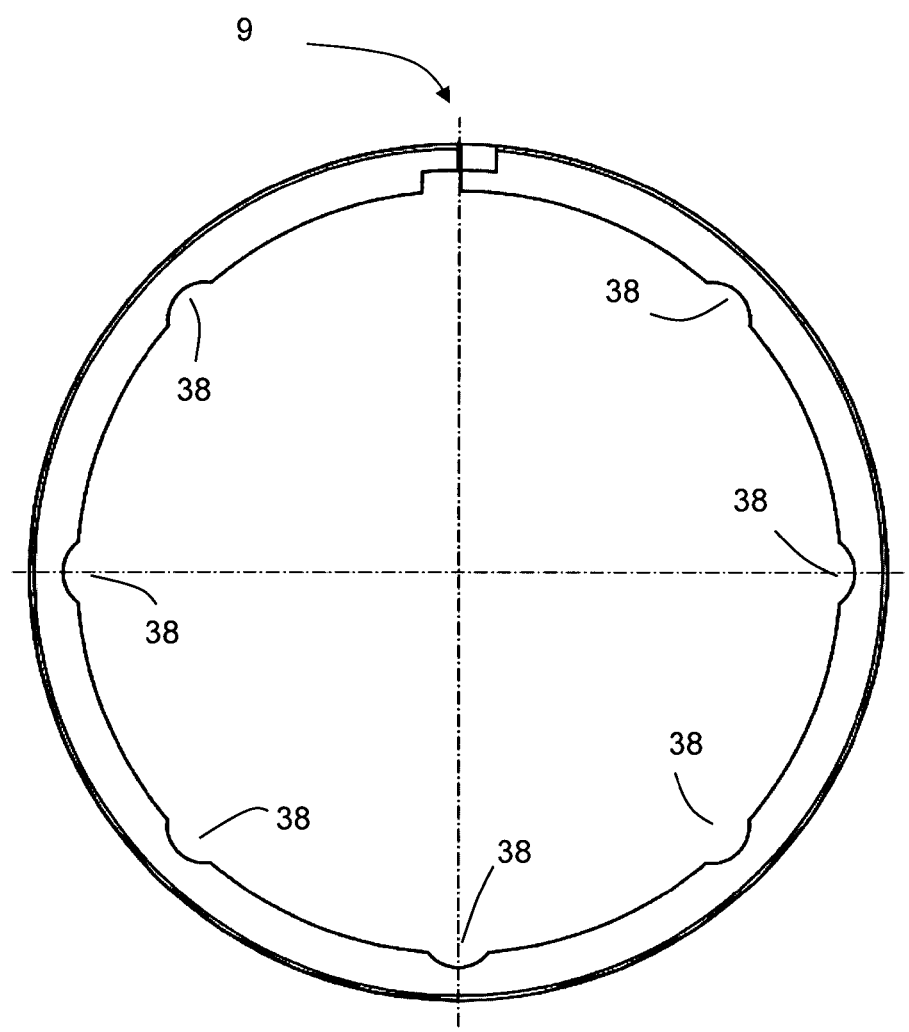

FIG. 10 shows a piston ring in which weakening recesses 38 are arranged opposite the radial ring surface 3. A total of seven weakening recesses 38, which are arranged at an angle of 45 degrees to each other, are provided in the exemplary embodiment. Furthermore, the weakening recesses 38 adjacent to the ring joint 9 each include an angle of likewise 45 degrees with respect to the ring joint 9. Due to the weakening recesses 38 and due to their uniform distribution, the spring-force-induced contact forces against an inner barrel surface 4 of a cylinder are reduced around the circumference in a uniformly-distributed manner, and the free movability and self-adjusting action between the projection section and the base section are supported. And, at the same time, the advantageous contact forces caused by the operating pressure of a pressure medium remain unimpaired.

Figure 11:
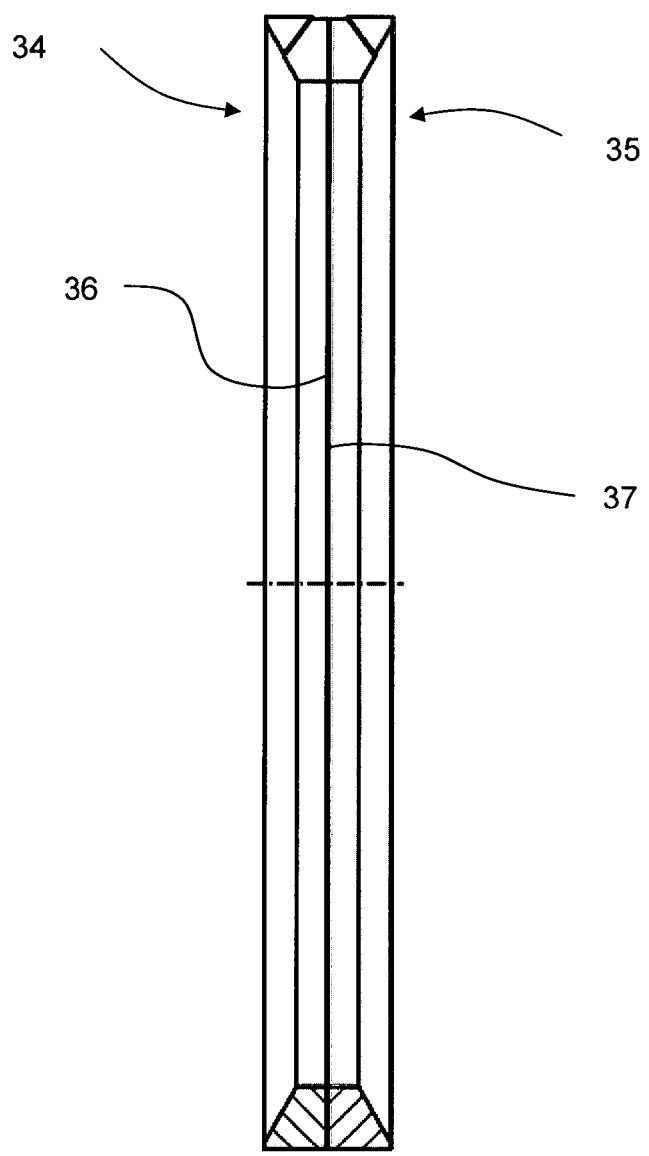

FIG. 11 shows a piston ring arrangement comprising a first piston ring 34 and a second piston ring 35. Both piston rings 34, 35 are designed as piston rings according to the invention. In addition, they each have an axial ring surface 36, 37. The two piston rings 34, 35 lie against each other at the axial ring surfaces 36, 37, wherein in this manner they are mounted in floating position relative to each other.

LIST OF REFERENCE NUMERALS 1 ring body
2 ring body surface
3 radial ring surface
4 inner barrel surface
5 inclined ring surface
6 outer ring groove of a piston
7 first ring body end
8 second ring body end
9 ring joint
10 projection section
11 projection contour cross section
12 base section
13 base section contour
14 receiving contour
15 receiving contour cross section
16 projection section separating surface
17 base section separating surface
18 separating plane
19 outer separating line
20 inner separating line
21 piston
22 cylinder
23 inclined ring groove surface
24 further inclined ring surface
25 further projection section
26 further projection contour cross section
27 further receiving contour
28 further receiving contour cross section
29 further projection section separating surface
30 further base section separating surface
31 further separating plane
32 further outer separating line
33 further inner separating line
34 first piston ring
35 second piston ring
36 axial ring surface of the first piston ring
37 axial ring surface of the second piston ring
38 weakening recess

The invention claimed is:

1. A piston ring for a piston with an outer ring groove having an inclined groove surface, the piston for disposition in a cylinder with a cylindrical inner barrel surface, the piston ring comprising:

a ring body having a first ring body end and a second ring body end and a ring joint, said first and second ring body ends being arranged opposite one another for defining said ring joint;

said ring body having a ring body surface including a radial ring surface being a sliding contact surface axially displaceable relative to the cylindrical inner barrel surface and an inclined ring surface being a lay-on surface for resting on the inclined ring groove surface, said ring body having a further inclined ring surface, said further inclined ring surface being inclined inversely to said inclined ring surface;

said first ring body end having a projection section with a projection section separating surface and a projection contour cross section, said first ring body end having a further projection section with a further projection section separating surface and a further projection contour cross section;

said second ring body end having a base section with a base section separating surface and a base section contour, said base section defining a receiving contour with a receiving contour cross section, said base section having a further receiving contour with a further receiving contour cross section, said base section having a further base section separating surface, said projection section engaging in said receiving contour, and said receiving contour cross section and said projection contour cross section coincide, said further projection section engaging in said further receiving contour and said further receiving contour cross section and said further projection contour cross section coinciding;

said projection section separating surface and said base section separating surface being provided opposite one other in an areal and sealing physical contact and defining a separating plane;

said further projection section separating surface and said further base section separating surface being opposite to each other in an areal and sealing physical contact and defining a further separating plane, said further separating plane having an inverse inclination to said further inclined ring surface;

said separating plane having an inverse inclination with respect to said inclined ring surface, said separating plane intersecting said radial ring surface and defining an outer separating line at an intersection line of said separating plane with said radial ring surface, said separating plane intersecting said inclined ring surface and defining an inner separating line at a second intersection line of said separating plane with said inclined ring surface, said separating lines defining said separating surfaces, and at least one of said separating lines having a curvature radius concentric with said ring body;

said further separating plane intersecting said radial ring surface and defining a further outer separating line at an intersection line of said further separating plane with said radial ring surface;

said further separating plane intersecting said further inclined ring surface and defining a further inner separating line at an intersection line of said further separating plane with said further inclined ring surface;

said further separating lines defining said further separating surfaces; and said further separating lines having a curvature radius concentric to one another and to said ring body.

2. The piston ring according to claim 1, wherein said outer separating line and said inner separating line have a curvature radius concentric with said ring body and with one other.

3. The piston ring according to claim 1, wherein said separating surfaces are constructed as lateral truncated-cone sub-surfaces.

4. The piston ring according to claim 1, wherein said receiving contour cross section is a triangle.

5. The piston ring according to claim 1, wherein said separating surfaces are constructed as wire erosion surfaces.

6. The piston ring according to claim 1, wherein said ring body has at least one weakening recess arranged radially on the inside thereof.

7. A piston ring arrangement, comprising:
   a first piston ring and a second piston ring, said piston rings are constructed according to claim 1;
   said piston rings each having a respective axial ring surface, and said piston rings being arranged in parallel, said axial ring surface of said first piston ring and said axial ring surface of said second piston ring resting in physical contact against each other.

\* \* \* \* \*